United States Patent [19]
Hieda et al.

[11] Patent Number: 5,804,676
[45] Date of Patent: Sep. 8, 1998

[54] PROCESS FOR PREPARING POLYMER

[75] Inventors: Shinichi Hieda; Masahiro Kurokawa; Yasushi Higuchi; Shojiro Kawahara, all of Hiratsuka, Japan

[73] Assignee: Mitsubishi Gas Chemical Company, Inc., Tokyo, Japan

[21] Appl. No.: 704,270

[22] Filed: Aug. 28, 1996

[30] Foreign Application Priority Data

Jun. 18, 1996 [JP] Japan ..................................... 8-157084

[51] Int. Cl.$^6$ ............................... C08F 2/08; C08F 20/14
[52] U.S. Cl. ......................... 526/65; 526/329.7; 528/501; 528/502 C
[58] Field of Search .................................. 526/65, 329.7; 528/501, 502 C

[56] References Cited

U.S. PATENT DOCUMENTS 4,833,221  5/1989  Albrecht ..................................... 526/64

FOREIGN PATENT DOCUMENTS 0 652 237  5/1995  European Pat. Off. .
7-133303  5/1995  Japan .

*Primary Examiner*—Thomas R. Weber
*Attorney, Agent, or Firm*—Frishauf, Holtz, Goodman, Langer & Chick, P.C.

[57] ABSTRACT

A process for continuously preparing a high quality methacrylic polymer with a high productivity is provided. The process comprises continuously polymerizing methyl methacrylate alone or a monomer mixture of methyl methacrylate and an alkyl acrylate by a solution polymerization using methanol as a solvent, directly feeding the resulting polymerization reaction product to an extruder having a plurality of vents, and extruding the polymer, while volatiles are removed through the vents.

20 Claims, 2 Drawing Sheets

PROCESS FOR PREPARING POLYMER

BACKGROUND OF THE INVENTION (i) Field of the Invention

The present invention relates to a process for preparing a methacrylic polymer, and more specifically, it relates to a process for preparing a methacrylic polymer which can be used as an injection molding material and/or a material for extruded sheets.

(ii) Description of the Related Art

Methacrylic polymers have excellent characteristics of transparency, weathering resistance and appearance, and therefore they have been used not only as signs, displays and glazing materials but also as optical materials.

Heretofore, as a manufacturing method for a methacrylic polymer which can be used as an injection molding material and/or a material for extruded sheets, a suspension polymerization method has usually been employed, but in this method, the polymer is contaminated with a secondary material such as a used suspending dispersant, and for this reason, it is difficult to obtain a high-purity polymer, and the polymer manufactured by this method is not suitable for the optical material or the like. Additionally, an after-treatment step for the polymer comprises intricate operations of filtration, washing and drying, and a large amount of waste water must be treated. Thus, the suspension polymerization method is still insufficient as an industrial process.

As other manufacturing methods for the methacrylic polymer, there are a bulk polymerization method, a solution polymerization method and the like. Heretofore, the bulk polymerization method has been used for the manufacture of a prepolymer for cast polymerization which has been disclosed in, for example, Japanese Patent Publication Nos. 3392/1961, 19697/1961, 4794/1963, 13536/1963, 3701/1965 and 36155/1977, and the solution polymerization method has been used for the manufacture of a polymer having a relatively low molecular weight suitable for a coating material or the like which has been disclosed in, for example, Japanese Patent Application Laid-open Nos. 110786/1974, 1280/1978 and German Patent DEP 2161909.0.

In recent years, as techniques which can manufacture the injection molding material and/or the material for extruded sheets and which can overcome the drawbacks of the suspension polymerization method, much attention has been paid to a continuous bulk polymerization method and a continuous solution polymerization method. These methods permit the manufacture of high-quality resins having excellent optical properties, because a suspending dispersant or the like is not used.

Japanese Patent Publication No. 32665/1977 has suggested the continuous bulk polymerization method in which the polymerization is carried out at a relatively low monomer conversion by the use of a tank type reactor and the unreacted monomer is then continuously separated and removed. Moreover, Japanese Patent Application Laid-open No. 111408/1991 has disclosed the continuous bulk polymerization method where specific reaction conditions are employed so that a ratio of the half-value period of a radical polymerization initiator to a mean residence time may be specified in a single continuous mixed tank reactor under agitation to provide a homogeneous reacting mass and so that a polymerization initiator concentration in the reactor may be controlled. In addition, the other bulk polymerization methods have been disclosed in Japanese Patent Publication No. 18694/1985 and Japanese Patent Application Laid-open No. 153702/1989.

However, in the continuous bulk polymerization method, it is very difficult owing to an autoacceleration effect called "a gel effect" that a polymerization reaction is stably controlled, while a high monomer conversion is maintained, and hence the final polymer having a high polymer concentration is scarcely obtained. In addition, the unreacted monomer remains in large quantities, and for the collection and the reuse of the unreacted monomer and for the concentration of the obtained polymer, a large amount of energy must be consumed in a devolatilization step, and in this case, since the polymer is subjected to heat history, coloring and deterioration tend to inconveniently occur.

On the other hand, as shown in Japanese Patent Publication No. 7845/1980 and the like, it is known that according to the continuous solution polymerization method, for example, the solution polymerization method in which benzene or an alkylbenzene is used as a solvent, the viscosity of a reaction solution decreases owing to the solvent, so that the gel effect is inhibited and the stable polymerization reaction is possible at the high monomer conversion. Moreover, Japanese Patent Application Laid-open No. 208308/1990 has described a process for preparing a high-purity methacrylic resin by the use of a specific inert solvent.

Furthermore, Japanese Patent Application Laid-open No. 201307/1989 has disclosed a method in which the solution polymerization of a monomer mixture containing methyl methacrylate as a main component is carried out using not less than 5% by weight and less than 30% by weight of a mixed solvent comprising a monovalent alkylalcohol and benzene or an alkylbenzene. In this method, however, the monovalent alkylalcohol merely occupies 5 to 50% by weight of the mixed solvent, and so the method is not such as to fundamentally change a usual method using benzene or the alkylbenzene as the solvent. The other solution polymerization methods have been disclosed in Japanese Patent Publication No. 22200/1965 and Japanese Patent Application Laid-open No. 287002/1993.

Even according to these continuous solution polymerization methods, if the polymer obtained by any of these methods is used as the injection molding material and/or the material for extruded sheets, it is unavoidable to remove volatile content comprising the unreacted monomer, the solvent and the like which remain in a polymer solution after the completion of the polymerization. As a technique for removing the volatile content from such a polymerizate, there has usually been utilized a method which comprises heating the polymerizate up to a high temperature, and then leading the heated product to a vacuum atmosphere to evaporate/separate the volatile content therefrom. Since it enables the treatment of a large amount of the polymerizate at one time, this method is suitable for mass production on an industrial scale.

For example, Japanese Patent Publication No. 119259/1995 has disclosed a process which comprises subjecting, to the continuous solution polymerization, a solution containing 40% by weight or more of a solvent selected from benzene, toluene and alkylbenzenes. That is to say, this process comprises carrying out the polymerization in two continuous mixed tank reactors while the system is maintained under reduced pressure and a part of an obtained crude polymer is drawn out, heating the crude polymer, leading it to a flush tank, devolatilizing it therein to prepare a molten polymer while avoiding the formation of foam encrustations, adding some additives thereto, and then pelletizing the polymer.

Furthermore, Japanese Patent Application Laid-open Nos. 133303/1995 and 133311/1995 have disclosed a method for carrying out the continuous solution polymerization in which a homogeneous system is maintained by the use of methanol as a solvent. However, this method has many problems which should industrially be solved, and for example, there is a problem that an obtained polymer is once taken out in the form of a foamed product after a polymerization step, and it is then required to be molded in a step using an extruder again.

In the case of such a continuous solution polymerization method, there is a limit to reducing the amount of the solvent, and even if the monomer conversion is heightened, the amount of the remaining volatile content inclusive of the solvent cannot be reduced, though the amount of the unreacted monomer present in the reaction solution can be decreased. In consequence, energy consumption which is required to remove the volatile content in this method is not different than in the bulk polymerization method on occasion. Additionally, this method also has problems such as the deterioration of thermal decomposition resistance of the polymer and the complication of the recovery and the reuse of the monomer component.

With regard to the thermal decomposition resistance, it has been reported that, among thermal decomposition reactions of the methacrylic polymer, the so-called zipper decomposition which is begun at a C—C single bond adjacent to a terminal double bond usually occurs in the vicinity of a temperature of 230° to 270° C., and it has also been reported that if a polymerization temperature as low as less than 100° C. is used, a thermally extremely weak head-head bond which cleaves at 200° C. or less remains [K. Hatada, T. Kitayama and E. Masuda, Polym. J., Vol. 1 (5), p. 395 (1986), and T. Kashiwagi, A. Inaba, E. Brown, K. Hatada and E. Masuda, "MACROMOLECULES", Vol. 19, p. 2160 (1986)]. In order to improve the thermal decomposition resistance of the methacrylic polymer, it is necessary to inhibit the two decomposition reactions of the zipper decomposition and the head-head bond cleavage just described. For the inhibition of the zipper decomposition, it is necessary to lower the ratio of the polymer having the terminal double bond, and for the inhibition of the head-head bond cleavage, it is necessary that the polymerization temperature should be set to 100° C. or more to suppress the formation of the head-head bond.

The polymer having the double bond at the terminal and/or the polymer having the head-head bond is thermally weak, and therefore, when it is subjected to heat history in an extrusion step and at the time of injection molding or the like, the polymer thermally decomposes at least partially. In consequence, some practical troubles occur. For example, molding defects such as silver streaks and foaming take place, and decomposition products emit an unpleasant odor. In view of these facts, it is very important to control the thermal decomposition resistance of the polymer which does not undergo the extrusion step yet.

For example, Japanese Patent Publication No. 72213/1995 has disclosed a preparation method of a methacrylic resin having an excellent thermal decomposition resistance which can be represented by a thermal decomposition index α. Furthermore, Japanese Patent Application Laid-open No. 294307/1991 has disclosed a methacrylic resin which can be prepared by the continuous bulk polymerization method and in which the ratio of the terminal double bond of the polymer measured by the use of gel permeation chromatography (GPC) and nuclear magnetic resonance (NMR) is 2.5% by weight or less. In this publication, however, concrete preparation conditions for controlling the thermal decomposition index or the terminal double bond are not described at all.

In Japanese Patent Application Laid-open Nos. 206904/1995, 206905/1995 and 206906/1995 and Japanese Patent Application No. 57362/1995, a polymerization method has been described in which amounts of a polymerization initiator and a chain transfer agent are regulated on the basis of a thermal decomposition ratio by thermogravimetric analysis to improve the thermal decomposition resistance in a polymerization step. However, this method has a problem that an obtained polymer is liable to be colored in a devolatilization step.

As examples of techniques for removing the remaining monomer, solvent and the like from a polymer composition obtained by carrying out the polymerization reaction in the above-mentioned way, there have been suggested volatilization devices typified by flush tanks described in Japanese Patent Publication Nos. 18393/1976, 30428/1979, 30670/1979, 36182/1979 and 50441/1980; a method for finally removing the volatile content by a screw type evaporator via a spiral tube evaporator described in Japanese Patent Publication No. 43242/1981; and a process which comprises heating a polymerizate, directly feeding it to a vent extruder or the like, and then collectively carrying out a series of after-treatments such as devolatilization, the mixing of additives and pelletizing.

As an example of such a devolatilization manner, for example, Japanese Patent Application Laid-open No. 89710/1987 has disclosed a method which comprises heating a methacrylic polymerizate up to a high temperature, casting it into a devolatilization tank having a space section in its upper portion to remove the volatile content therefrom, and then feeding the product to a vent extruder to reduce the remaining volatile content to 1% by weight or less.

Furthermore, Japanese Patent Publication Nos. 17555/1977 and 29914/1976 as well as Japanese Patent Application Laid-open Nos. 17516/1993 and 148311/1993 have reported a process which comprises heating, up to a high temperature, a methacrylic polymer composition prepared by the bulk polymerization method or the solution polymerization method, directly blowing it, through fine orifices, against a feeding screw of a devolatilizing extruder maintained in an atmosphere having a pressure less than atmospheric pressure to separate and recover most of the volatile content, and then separating the remaining volatile content at a downstream vent in which a temperature of 250° to 290° C. and a reduced pressure are kept.

In this process, however, the interior of the devolatilization tank is required to be heated up to a high temperature of 200° C. or more, and the polymer tends to stagnate on the heated wall of the tank for a long time, so that there is a fear that the quality of the polymer deteriorates. Since a monomer, an alkylbenzene and the like have a strong affinity for the polymer and they are less volatile, there is required an extruder having a high devolatilization power which is equipped with a multi-stage vent in order to directly treat the polymerizate containing the volatile content at a high concentration, and it is also necessary that the vents of the extruder are maintained at a high temperature under a high vacuum. In view of such operational circumstances, the problem of the increased cost of facilities is also present in the case that this process is utilized as an industrial process.

Japanese Patent Application Laid-open No. 194004/1990 has described a method which comprises mixing a pressurized and molten polymerizate with an extracted gas in a supercritical state, and then reducing the pressure to remove the volatile content from the product. However, in order to apply such a supercritical state to an industrial continuous process, it is necessary to enhance the pressure resistance of an apparatus, which leads to many problems such as the increases in the cost of facilities.

On the other hand, Japanese Patent Publication Nos. 86492/1994 and 37482/1995 have disclosed a method which comprises carrying out the radical polymerization of a monomer mixture mainly comprising methyl methacrylate in a solvent, for example, an aliphatic monovalent alcohol such as methanol or an aliphatic hydrocarbon such as hexane, and then precipitating and separating the thus obtained polymer in the state of a slurry. However, this method has many problems which should be solved for an industrial application. For example, the solvent is used in a large amount, i.e., as much as 80 to 30 parts with respect to 20 to 70 parts of the monomer component, and in order to separate the polymer, a precipitation step, a filtration step and a drying step are necessary. Additionally, in the case of the continuous process, the polymer slurry must be delivered and treated as a constant composition.

Furthermore, in Japanese Patent Application Laid-open No. 133312/1995, another method has been disclosed which comprises carrying out a continuous solution polymerization in a water-methanol mixing solvent system, and then cooling and pressing the thus obtained polymer to separate the same therefrom. In this method, however, a step in which the pressed polymer is further molded by an extruder is required, and so the process is intricate, which raises the problem of the increased cost of facilities in the case that this method is utilized as an industrial process.

Thus, the present invention has been attained to solve the above-mentioned problems of the conventional techniques, and an object of the present invention is to provide a process for economically advantageously preparing a high-quality methacrylic polymer by a stably controlled polymerization reaction.

SUMMARY OF THE INVENTION

The present inventors have found that most of a volatile content can efficiently be removed from a polymer composition by continuously feeding, to a polymerization reactor, a material solution comprising a specific amount of methanol as a solvent, methyl methacrylate alone or a monomer component comprising methyl methacrylate and an alkyl acrylate, a chain transfer agent and a polymerization initiator to carry out polymerization, continuously drawing a part of a polymerizate, heating it, and then feeding it onto a screw of an extruder through a feed opening substantially maintained at atmospheric pressure. In addition, it has also been found that a high-quality polymer which is usable as a molding material can be prepared without troubles such as coloring, while a high productivity is stably kept, by removing the remaining volatile content from the polymer composition at a downstream vent, and then extruding the same. In consequence, the present invention has been completed on the basis of these findings.

That is to say, the present invention is directed to a process for preparing a polymer which comprises the steps of (1) carrying out the continuous polymerization reaction of methyl methacrylate alone or in a monomer mixture in a homogeneous solution state in the presence of 0.1 to 160 mmol/l of a radical polymerization initiator having a half-value period of 0.6 to 60 minutes at a polymerization temperature and 0.1 to 370 mmol/l of a chain transfer agent based on a mixture of 71 to 95 parts by weight of methyl methacrylate alone or the monomer mixture comprising 75% by weight or more of methyl methacrylate and 25% by weight or less of an alkyl acrylate and 29 to 5 parts by weight of methanol as a solvent (a diluent) in a polymerization reactor comprising one or two serially connected polymerization tanks under agitation to provide a homogeneous solution reacting mass so that a monomer conversion may be in the range of 55 to 93 mol % at a polymerization temperature of 100° to 180° C., and (2) directly feeding, at a temperature of 130° to 270° C., a polymerizate drawn from the polymerization reactor to an extruder having a plurality of vents set to a barrel temperature of 170° to 270° C., and extruding the polymerizate through the extruder, while most of a volatile content is separated and collected through the vents of the extruder and while the remaining volatile content is removed through at least one other downstream vent set to a vent pressure of 1 to 400 mmHg, thereby preparing the polymer in which the content of the remaining volatile content is 1% by weight or less, a weight-average molecular weight measured by gel permeation chromatography (GPC) is in the range of 80,000 to 200,000, and a thermal decomposition ratio is 3.0% by weight or less. The thermal decomposition ratio referred to herein is a percentage of the reduced weight of a sample in the range of 30° to 300° C. at a heating rate of 2° C./minute with respect to the total reduced weight of the sample at a time of thermogravimetric analysis in which the sample dried at 80° C. for 24 hours is heated up to a temperature of 30° to 450° C. at a heating rate of 2° C./minute under a nitrogen gas stream.

DESCRIPTION OF PREFERRED EMBODIMENTS

Figure 1:
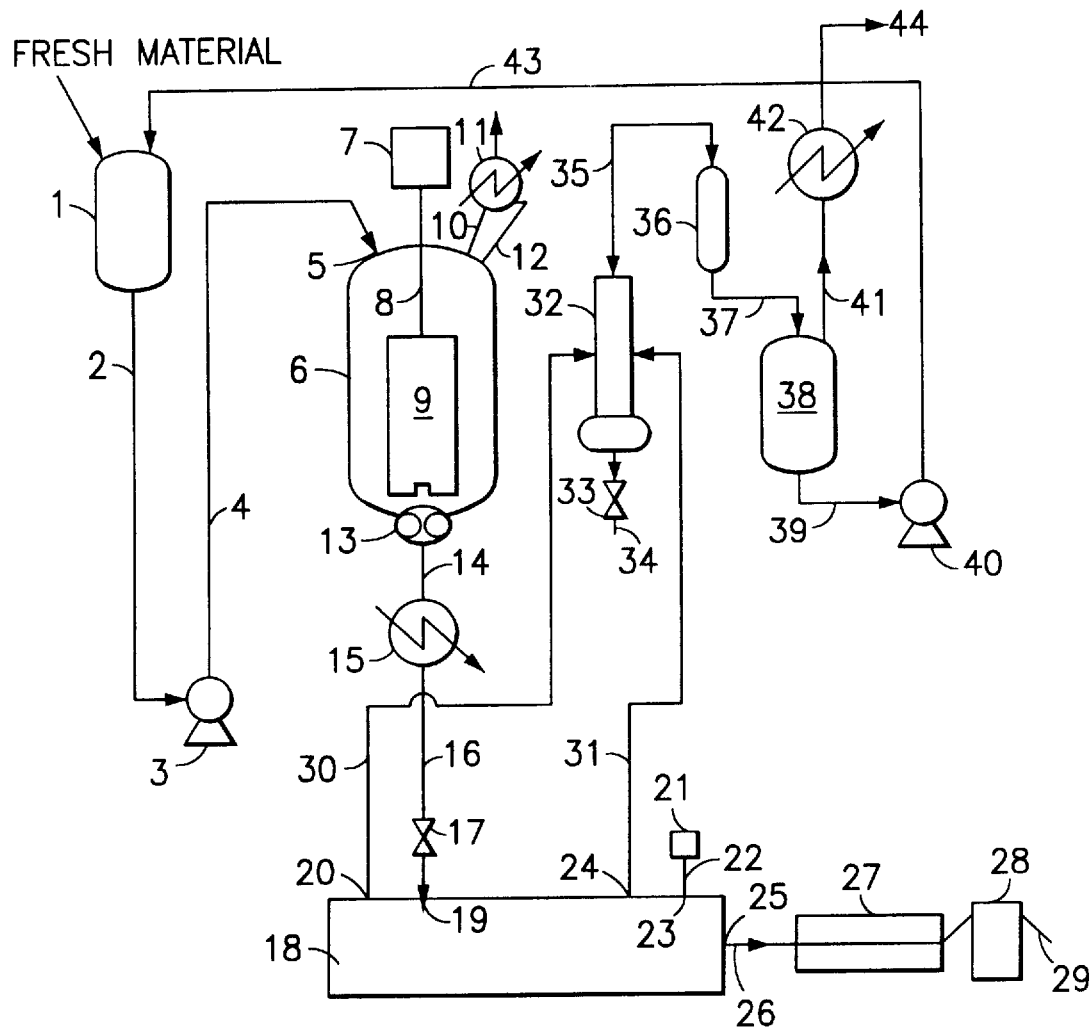
FIG. 1 is a schematic view of an apparatus used in Example 1, and in this drawing, reference numeral 1 is a material blending tank, numeral 2 is a line, 3 is a constant delivery pump, 4 is a line, 5 is a feed opening, 6 is a reactor equipped with a jacket, 7 is a motor, 8 is a stirring shaft, 9 is a stirring blade, 10 is a vapor drawing line, 11 is a condenser, 12 is a reflux line, 13 is a constant delivery pump, 14 is a line, 15 is a heater, 16 is a line, 17 is a control valve, 18 is an extruder, 19 is a first vent, 20 is a feed opening for a polymerization reaction product, 21 is an additive blending tank, 22 is a line, 23 is a feed opening for additives, 24 is a second vent, 25 is a die of the extruder, 26 is a polymer strand, 27 is a water bath, 28 is a pelletizer, 29 is pellets, 30 is a line, 31 is a line, 32 is a distillation column, 33 is a valve, 34 is a line, 35 is a line, 36 is a condenser, 37 is a line, 38 is a receiver, 39 is a line, 40 is a constant delivery pump, 41 is a line, 42 is a heat exchanger, 43 is a line, and 44 a line leading to is a vacuum device.

Methanol which can be used as a solvent in the present invention has the following features.

(1) Methanol can completely be dissolved in a monomer component of methyl methacrylate and/or an alkyl acrylate irrespective of temperature, and it also has a sufficient solubility to a methacrylic polymer at a temperature of 100° C. or more and can maintain the homogeneity of a polymer solution in a wide concentration range. Hence, methanol is desirable as a solvent for a solution polymerization.

(2) When methanol is used, the viscosity of the polymer solution is lower as compared with when a solvent such as an alkylbenzene is used at an equal concentration of the methacrylic polymer.

(3) When a polymerizate containing the solvent is cooled, the solubility of a volatile content in the polymer rapidly decreases. Therefore, the solvent is liable to be separated from the polymer, so that the deposition of the polymer on the inside walls of an apparatus and pipes can be inhibited.

(4) Since the boiling point of methanol is lower than that of the monomer component, the ratio of methanol is higher in a gaseous phase in a polymerization reactor or a reflux cooling line than in a liquid phase, so that the adhesion of scale onto the walls of the reflux cooling line and the like can be suppressed.

(5) Methanol has a relatively low boiling point and is easily volatile, and it can further form an azeotropic mixture having a low boiling point with the methacrylic monomer or the acrylic monomer.

(6) At a temperature of 80° C. or less, methanol scarcely dissolves the methacrylic polymer.

(7) Methanol is produced in large quantities on an industrial scale, and so it is inexpensive and easily available.

By virtue of these features, the amount of the solvent can be reduced by the use of methanol as the solvent, and a stable operation can be done at a heightened polymer concentration in the polymer solution. Furthermore, since methanol can easily be separated from the polymer solution and can form the azeotropic mixture to promote the evaporation of the monomer component, methanol is scarcely contained in the product, in contrast to a solution polymerization method using an alkylbenzene.

As understood from the above, the solution polymerization process of the monomer mixture mainly comprising methyl methacrylate which uses methanol as the solvent can improve the productivity and particularly simplify a devolatilization step and a volatile content recovery step of a manufacturing plant, in contrast to a conventional method using a solvent such as the alkylbenzene. As a result, this solution polymerization process permits the methyl methacrylate polymer to be economically beneficially manufactured.

The process of the present invention comprises the steps of a material blend step, a polymerization step, a devolatilization step and a volatile content recovery step in this order. Next, the process will be described in the order of these steps.

In the material blend step, the predetermined amounts of a monomer component, methanol, a chain transfer agent and a polymerization initiator are mixed, and the mixture is then continuously fed to a polymerization reactor. At this time, as much of the components as required can be mixed with a condensed solution delivered from the volatile content recovery step after composition analysis, whereby a recycle material can be used in a circulation manner.

The monomer component which can be used in the present invention is methyl methacrylate alone or a monomer mixture comprising 75% by weight or more of methyl methacrylate and 25% by weight or less of an alkyl acrylate, and in the monomer mixture of the present invention, there are not substantially contained an unsaturated aliphatic hydrocarbon such as ethylene, an unsaturated aromatic hydrocarbon such as styrene, unsaturated carboxylic acids such as acrylic acid, methacrylic acid, maleic acid and their anhydrides, an unsaturated chlorinated hydrocarbon such as vinyl chloride and/or a vinyl ester such as vinyl acetate.

The alkyl acrylate is an acrylic ester derived from an alcohol having the alkyl group of 1 to 8 carbon atoms. Examples of the acrylic ester include methyl acrylate, ethyl acrylate, n-propyl acrylate, iso-propyl acrylate, n-butyl acrylate, iso-butyl acrylate, tert-butyl acrylate, 2-ethylhexyl acrylate and n-octyl acrylate, and the preferable acrylic ester can be selected from the group consisting of methyl acrylate, ethyl acrylate and n-butyl acrylate. These acrylic esters can be used singly or in a combination of two or more thereof, but the monomer mixture comprising 75% by weight or more of methyl methacrylate and 25% by weight or less of methyl acrylate is particularly preferably used.

The polymerization activity of methyl methacrylate is different from that of the alkyl acrylate, and hence a monomer composition in the material is not always equal to a copolymer composition, but the relation between both the components can easily be decided by a technique described in Takayuki Otsu, "CHEMISTRY OF POLYMER SYNTHESIS", Kagaku Doujin (1979) and the like.

In the present invention, it is important that methanol is used in a ratio of 29 to 5 parts by weight and 71 to 95 parts by weight of the monomer component, and preferably in a ratio of 25 to 7 parts by weight based on 75 to 93 parts by weight of the monomer component. If the amount of the monomer component is less than 71% by weight, the productivity is low, and the load of the devolatilization step and the volatile content recovery step is high, which is disadvantage from the viewpoint of energy consumption. In addition, a selectable molecular weight range is limited, and the thermal decomposition resistance of the obtained polymer noticeably deteriorates. Conversely, when it is more than 95% by weight, the viscosity of the polymer solution increases, and it is difficult to stably control the polymerization, as in a bulk polymerization.

In the present invention, a polymerization initiator can be used which decomposes at a polymerization temperature to generate an active radical, but this polymerization initiator is required to achieve a desired polymerization ratio in the range of a mean residence time, and it should be met that the half-value period of the polymerization initiator at the polymerization temperature is in the range of 0.6 to 60 minutes, preferably 1 to 30 minutes. Examples of the radical polymerization initiator include di-tert-butyl peroxide, di-tert-amyl peroxide, $\alpha,\alpha'$-azobisisobutylonitrile, benzoyl peroxide, tert-butylperoxyisopropyl carbonate, tert-butyl peroxybenzoate, dicumyl peroxide, tert-amylcumyl peroxide, tert-butylperoxy(2-ethyl hexanoate), tert-amylperoxy isononanoate and tert-hexylperoxyisopropyl carbonate. The above-mentioned half-value period can easily be determined by the use of several constants described in "ORGANIC PEROXIDES", Data No. 13 published Nippon Oils & Fats Co., Ltd., Technical Data published Atochem Yoshitomi Co., Ltd., and "AZO POLYMERIZATION INITIATORS" published by Wako Junyaku Kogyo Co., Ltd.

These polymerization initiators can be used singly or in a combination of two or more thereof, and the necessary amount of the polymerization initiator is added to each polymerization reactor in order to obtain a desired polymerization ratio therein. The amount of the polymerization initiator depends upon its half-value period, but it is preferably in the range of 0.1 to 160 mmol/l, more preferably 0.1 to 100 mmol/l in order to obtain a weight-average molecular weight of about 80,000 to 200,000 and a polymerization ratio of 55 to 93 mol %. In the case that the molecular weight is constant, if the concentration of the polymerization initiator is high, the concentration of the chain transfer agent must be lowered, so that the production ratio of a polymer having a terminal double bond increases, with the result that the thermal decomposition resistance noticeably deteriorates.

As the chain transfer agent, any agent can be used, so far as it permits the preparation of a product having a desired molecular weight without impairing the polymerization reaction, and mercaptans, an α-methylstyrene dimer and the like can usually be used as the chain transfer agent. Examples of the mercaptans include primary, secondary and tertiary mercaptans each having an alkyl group or a substituted alkyl group, for example, 1-butanethiol, 2-butanethiol, 1-octanethiol, 1-dodecanethiol, 2-methyl-2-heptanethiol, 2-methyl-2-undecanethiol, 2-methyl-2-propanethiol, mercaptoacetic acid and its esters, 3-mercaptopropionic acid and its esters, and 2-mercaptoethanol and its esters. These polymerization initiators can be used singly or in a combination of two or more thereof. In order to obtain the product having the desired molecular weight, the necessary amount of the chain transfer agent is added, and it is preferably in the range of 0.1 to 370 mmol/l. If the concentration of the chain transfer agent is too low, the production ratio of the polymer having the terminal double bond increases, so that the thermal decomposition resistance deteriorates. Conversely, if the concentration of the chain transfer agent is too high, the weight-average molecular weight of the product is less than 80,000, so that required mechanical properties cannot be obtained.

The amounts of the polymerization initiator and the chain transfer agent to be added can be decided by calculation in accordance with the theoretical relation of a polymerization rate between a desired polymerization ratio or molecular weight and factors such as a monomer concentration, a solvent concentration, a polymerization temperature, a mean residence time and an initiator efficiency, for example, in a manner described in Takayuki Otsu, "CHEMISTRY OF POLYMER SYNTHESIS", Kagaku Doujin (1979) and Imoto Tatsuya and Ri Shuitsu, "POLYMERIZATION REACTION ENGINEERING", Nikkan Kogyo Newspaper Publishing Co. (1970).

As a material blending method, there are a batch method, a continuous method and the like, and any method may be employed, so far as it can accomplish a homogeneous blending operation. In the case of the batch method, two or three material blending tanks are installed, and blending and feeding are carried out while these tanks are alternately switched. In the continuous method, the flow rate of each component is automatically controlled to a predetermined value in each line, and the respective components are mixed and then fed to the reactor.

Dissolved oxygen in the material makes a monomer conversion unstable and causes the coloring of products, and therefore it is required to be substantially removed. In the case of the batch method, there can usually be used a technique which comprises dispersing an inert gas such as nitrogen in the material blending tank for a certain time by usual bubbling, a disc atomizer or the like, and in the case of the continuous method, there can usually be used a technique which comprises mixing the material solution with the inert gas by an in-line mixer installed in a line, and then doing gas-liquid separation. According to each of the techniques just described, dissolved oxygen can substantially be removed.

The material solution prepared by the above-mentioned procedure, after the removal of insolubles, is fed to the polymerization reactor, preferably via a filter. Alternatively, the material solution may be cooled and then fed thereto, whereby the polymerization reaction can further stably be controlled.

In the polymerization step, a polymerization temperature is in the range of 100° to 180° C., preferably 130° to 170° C., more preferably 135° to 165° C. If the polymerization temperature is less than 100° C., solubility deteriorates, so that the homogeneity of the solution cannot be maintained, depending upon the concentration of the polymer. On the other hand, if the polymerization temperature is more than 180° C., an operation pressure increases, so that the manufacturing cost of the reactor increases, which is economically disadvantageous. In addition, it has been reported that the formation of oligomers increases, so that coloring is easily caused, which results in the deterioration of a polymer quality [Fumio Ide, "POLYMER", Vol. 27, November Issue, p. 819 (1978)].

In the present invention, the monomer conversion is in the range of 55 to 93 mol %, preferably 60 to 90 mol %, more preferably 65 to 85 mol %. If the monomer conversion is less than 55 mol %, the load of the devolatilization step and the volatile content recovery step inconveniently increases. In order to heighten the monomer conversion to 93 mol % or more, a long residence time is necessary, and if the monomer conversion is 93 mol % or more, the polymerization reactor having a large capacity is required for the enhancement of a production efficiency, and the viscosity of the obtained polymerizate increases, which is impractical.

In this monomer conversion range, a gel effect may occur, depending upon the concentration of the solvent. According to the process of the present invention, however, methanol as the solvent decreases the viscosity of the polymerizate, and a polymerization ratio at which the gel effect is expressed is heightened, so that the influence of the gel effect is inhibited and the polymerization reaction can be controlled in a stable state.

The polymerization reactor comprises one continuous mixed tank reactor or two serially connected continuous mixed tank reactors, and the one continuous mixed tank reactor is preferable. With regard to the shape of the polymerization reactor, any shape is acceptable, so long as it enables the complete mixing. A loop reactor is also usable, but a stirred tank reactor is preferable.

The material solution is continuously fed into the polymerization reactor, and immediately when a substantial mixing state has been attained, the solution in the polymerization reactor is continuously taken out. In the case that the stirring tank is used, a usual paddle blade and anchor blade are usable as a stirring blade, but preferable are a double helical ribbon blade, a full zone blade made by Shinko Pantec Co., Ltd., a Sunmeller blade and an AR blade made by Mitsubishi Heavy Industries, Ltd., and a Maxblend blade and a Superblend blade made by Sumitomo Heavy Industries, Ltd.

A mean residence time in the present invention is usually in the range of 2 to 7 hours, preferably 2.5 to 6 hours, more preferably 3 to 5 hours per polymerization reactor. If the mean residence time is less than 2 hours and the polymerization reaction is carried out until the monomer conversion of the present invention, a calorific value increases, so that the stable control of the reaction is difficult and the amount of the polymerization initiator to be added must be increased. In addition, if it is attempted to obtain a desired molecular weight, the production ratio of the polymer having a terminal double bond increases, so that the thermal decomposition resistance noticeably deteriorates. If the mean residence time is more than 7 hours, the polymerization reactor having a large capacity is required, which is economically disadvantageous.

In the case that the polymerization reaction is carried out in the two serially connected continuous mixed tank reactor for polymerization, an intermediate polymerization reaction product drawn from the first polymerization reactor may directly be fed to the second polymerization reactor, or a side feed material solution including a monomer mixture comprising 0 to 100% by weight of methyl methacrylate and 100 to 0% by weight of an alkyl acrylate and/or methanol can simultaneously be fed. The side feed material solution may be the same as or different from the material solution fed to the first polymerization reactor. Furthermore, at least a part of the side feed material may be a recycling material from the volatile content recovery step, and in the case that the chain transfer agent and/or the polymerization initiator is contained in the side feed material solution, the material solution fed to the first polymerization reactor may be the same as or different from the side feed material solution. Moreover, no particular restriction is put on the weight ratio of the side feed material to the main material, but this weight ratio is usually 30% by weight or less, preferably 20% by weight or less. It is necessary that the polymer obtained from the polymerization reactor should possess a desired polymerization ratio, average molecular weight, copolymerization composition of the polymer and thermal decomposition resistance.

No particular restriction is put on a polymerization pressure, and by pressurizing with an inert gas, the polymerization reaction can be carried out. However, when an excessively high pressure is used, the amount of condensed vapor containing methanol as a main component in a reflux condenser attached to each polymerization reactor decreases, which is disadvantageous from the viewpoint of heat removal. Therefore, the polymerization is usually done in the vicinity of the vapor pressure of the polymerizate at the polymerization temperature.

There can be used a technique of utilizing the sensible heat of the material, a technique of using a heating medium to remove heat transferred from the reaction solution, and a technique of using the evaporation latent heat of methanol and the monomer component in the reaction solution to remove polymerization heat, but it is desirable to use these techniques together. Since the process of the present invention uses methanol as a solvent, a greater amount of heat can be removed owing to the evaporation latent heat at a constant solvent weight concentration as compared with a bulk polymerization and a solution polymerization method using an alkyl benzene as the solvent. Furthermore, since methanol is contained in a gaseous phase, a difficulty such as the adhesion of scale in a reflux reactor can be inhibited, in contrast to the bulk polymerization. In consequence, the insertion of a heat exchanger into the polymerization reactor is unnecessary, and it is also unnecessary that an external heat exchanger is installed and the reaction solution is externally circulated by a circulating pump. Thus, the structure of the reactor can be simplified, and a utility unit and equipment cost can be decreased, which are economically advantageous.

The polymerizate in the present invention contains the polymer, the monomer component and the solvent as main components as well as components derived from the polymerization initiator, the chain transfer agent and additives which are added at the time of the polymerization. The concentration of the polymer is in the range of 39 to 90% by weight, preferably 43 to 87% by weight, more preferably 46 to 85% by weight. If the concentration of the polymer is more than 90% by weight, the polymerizate has a high viscosity, and so the movement/flow of the product through pipes and a heater is difficult. If the concentration of the polymer is less than 39% by weight, the volatile content in the polymer increases, and the load of the devolatilization step and the volatile content recovery step also increases, so that a production efficiency lowers. For these reasons, such a low polymer concentration is not practical. The polymerizate contains usually 5 to 43% by weight, preferably 8 to 38% by weight, more preferably 10 to 33% by weight of the monomer component. It is actually difficult to obtain the polymer composition in which the amount of the monomer component is less than 5% by weight, and if the amount of the monomer component is in excess of 43% by weight, the productivity of the polymer to be obtained deteriorates, which is not practical.

In the devolatilization step, the polymerizate is required to be maintained, until the practice of the devolatilization, at not less than a temperature at which the product has such a viscosity that the product is homogeneous and flowable, and in compliance with the composition of the volatile content, the product is maintained at a temperature at which an optimum devolatilization effect can be obtained. This temperature is usually in the range of 130° to 270° C., preferably 135° to 250° C., more preferably a polymerization temperature. If the temperature is less than 130° C., the viscosity of the solution increases, so that it is difficult to quantitatively feed the polymerizate to an extruder. If the temperature is more than 270° C., the production of high-boiling substances such as a dimer and a trimer unpreferably increases.

Furthermore, the pressure in the heater depends upon the composition of the volatile content in the polymerizate, the temperature and the feed rate of the polymerizate, a pressure loss by the pipes, the heater and a nozzle, and the like, but any pressure is acceptable, so far as it does not exceed the limit of the pressure resistance of the pipes, the heater and/or the like.

In heating the polymerization reaction product up to the polymerization temperature or more, a heat exchanger is used, and a shell and tube type heat exchanger, a static mixer type heat exchanger and the like are suitable. In order to avoid the heat deterioration of the polymerizate and/or the increase in the production of by-products such as the dimer and the trimer, the polymerizate is required to be heated up to a predetermined temperature in the shortest possible time, and the heat exchanger suitably has a structure in which heat exchange can efficiently be carried out. For the purpose of promptly feeding the heated polymerizate to the extruder, it is desirable that this heater is arranged as close as possible to a feed opening of the extruder.

The polymerizate is directly fed from an outlet of the pipe and/or the heater via a control valve for the adjustment of pressure and flow rate to the extruder having a plurality of vents in which a barrel temperature is set to 170° to 270° C., preferably 180° to 260° C., more preferably 190° to 250° C.

According to the utilization of the control valve, a pressure difference is created in the range of from the pipe and/or the heater to the extruder to keep the pipe and/or the heater under pressure. In consequence, abrupt foaming and volatilization can be prevented from extending to the pipe and/or the heater, the heat exchange power of the heater can be enhanced, the evaporation/separation of the volatile content can be promoted, and a utility unit can also be reduced. Since the abrupt foaming and volatilization in the pipe can be suppressed, the polymerizate can be fed to the feed opening of the extruder at a constant flow rate and with a constant composition, so that pulsation which causes trouble in the extruder can be inhibited.

Any control valve can be used, so far as it has a function of adjusting the pressure and the flow rate, and a needle valve can preferably be used.

The pressure in the feed opening of the pipe and/or the heater is maintained in the range of 3 to 80 kg/cm$^2$, preferably 7 to 60 kg/cm$^2$, and under this condition, the polymerizate can efficiently be subjected to devolatilization. If the pressure at the feed opening is less than 3 kg/cm$^2$, the heat exchange power in the pipe and/or the heater lowers, and if it is more than 80 kg/cm$^2$, the pressure resistance of the pipe and/or the heater must be heightened, which leads to the increase in a manufacturing cost. Thus, the employment of such a high pressure is economically disadvantageous.

The polymerizate is fed onto a screw of the extruder through the feed opening disposed in the first vent of the extruder or in a barrel in the vicinity of the vent, and most of the volatile content is separated and recovered through the first vent, and the polymer is carried toward a downstream side by the screw.

The feed opening may be disposed at any position in the first vent of the extruder or in the barrel in the vicinity of the vent, but the temperature of the feed opening is required to be sufficiently kept. In the case that the feed opening is attached in the first vent, it is arranged close to the screw of the extruder, whereby the polymerizate can be injected directly. Alternatively, in the case that the feed opening is attached in the barrel in the vicinity of the first vent, it is usually arranged on the downstream side of the first vent. In this case, the polymerizate can be fed to the barrel of the extruder from any direction on the vertical section of the screw of the extruder.

In the first vent of the extruder, nearly atmospheric pressure in the range of 230 to 2280 mmHg, preferably 300 to 1520 mmHg, more preferably 380 to 1140 mmHg is maintained. Since the boiling point of methanol is relatively low, the volatile content can be smoothly recovered, even if the pressure in the first vent is nearly atmospheric pressure. The concentration of the remaining volatile content of the polymer composition in the vicinity of the first vent is maintained at 1 to 10% by weight, preferably 1 to 6% by weight.

The extruder which can be used to remove the volatile content from the polymerizate should be equipped with the vent for exhausting the volatile content, and should have a function of kneading and melting the polymer composition from which most of the volatile content has been removed through the first vent and a function of afterward extruding, through a die, the polymer composition from which the remaining volatile content has been removed through the vent on a downstream side. In general, a twin-screw extruder having the usual vents can be used. Furthermore, there can also suitably be used the extruder in which a barrel temperature can be set every member of from the feed portion to the die. The temperature of each portion of the extruder can be set in compliance with the kind and the brand of polymer composition to be manufactured, and the temperature of the barrel is maintained at 170° to 270° C., preferably 190° to 250° C. Since most of the volatile content can be separated and removed in the first vent, the downstream vent does not have to be kept in a particularly high vacuum state, but the pressure in the downstream vent is maintained at 1 to 400 mmHg, preferably 5 to 200 mmHg. In the case that a plurality of the downstream vents are arranged, for example, in the case that two downstream vents are disposed, the second and third vents may be maintained at the same pressure or at different pressures, but the vent on the downstream side is preferably maintained at a lower pressure than the vent near to the first vent. If necessary, some additives can be added to the polymer composition by the use of the extruder, and examples of the additives include an ultraviolet light absorber, a lubricant, an antioxidant, a dye, a pigment, an antistatic agent, a light diffuser, an impact resistance improver and a flame retardant. The additives may be added through the feed opening for the polymerizate and/or a position on the downstream side of the first vent.

The thus extruded polymer is finely cut by a pelletizer or the like to obtain a polymer which can be used as an injection molding material, and this polymer contains usually 1% by weight or less, preferably 0.5% by weight or less, more preferably 0.4% by weight or less of the remaining volatile content comprising the unreacted monomer, the solvent, the unreacted polymerization initiator, the unreacted chain transfer agent and/or the dimer or the trimer derived from the monomer. Since the obtained polymer is used as the injection molding material or a material for extruded sheets, it is preferable that the weight-average molecular weight of the polymer measured by GPC is usually in the range of 80,000 to 200,000, preferably 90,000 to 160,000. If the weight-average molecular weight is less than 80,000, necessary mechanical properties cannot be obtained, and if it is more than 200,000, the melting viscosity of the polymer is high, so that it is difficult to carry out injection molding or extrusion.

The thermal decomposition ratio of the obtained polymer is required to be 3.0% by weight or less, preferably 1.0% by weight or less. Here, the thermal decomposition ratio is a percentage of the reduced weight of a sample in the range of 30° to 300° C. at a heating rate of 2° C./minute with respect to the total reduced weight of the sample at a time of thermogravimetric analysis in which the sample dried at 80° C. for 24 hours is heated up to a temperature of 30° to 450° C. at a heating rate of 2° C./minute under a nitrogen gas stream. If the thermal decomposition ratio is in excess of 3.0% by weight, heat deterioration occurs at the time of the injection molding or the extrusion, and coloring and the emission of a bad smell also take place. In addition, the polymer having a terminal double bond is present in large quantities, which causes molding defects such as silver streaks and foaming. Consequently, the product having a desirable quality cannot be obtained.

In the volatile content recovery step, the volatile content evaporated and separated from the polymerization reaction product in the devolatilization step is led to a condenser usually by an exhaust device such as an ejector, a blower or a vacuum pump, and then cooled and condensed therein to recover itself. By-products such as the dimer, the trimer and the oligomer derived from the monomer as well as high-boiling substances such as the unreacted chain transfer agent are required to be removed. For this removal, there can be used a method which comprises leading the volatile content to the condenser, cooling/condensing it, and then separating/removing the high-boiling substances by a high-boiling substance separator, or another method which comprises separating/removing the high-boiling substances by the high-boiling substance separator prior to the condensation of the volatile content, leading the volatile content to the condenser, and then cooling/condensing it therein.

As the high-boiling substance separator, a simple flush tower, a demister or a usual distillation column can be used. It is preferable that a small amount of air is introduced into the column so as to prevent the polymerization in the column, and then discharged through the condenser at the top of the column. The recovered solution from which the high-boiling substances have been separated/removed is forwarded to a storage tank, but this storage tank preferably has an air atmosphere therein. The above-mentioned recovered solution is subjected to a composition analysis, and then delivered to a material blend step and/or a side feed material blending tank.

As described above, the process of the present invention enables a stably controlled operation, can simplify facilities, can relieve heat history which the polymer suffers, and can reduce a contact area with equipment which causes contamination.

Therefore, an energy consumption for the recovery of the volatile content under reduced pressure, the maintenance of vacuum in the flush tank and the maintenance of the flowability of the polymerizate can be saved, and the power of facilities such as a vacuum device, a condenser and an extruder may be low. In addition, a polymer which should be protected from heat deterioration and contamination can advantageously be treated without any coloring and without any impairment of appearance. In consequence, a utility unit and equipment cost can be reduced, and hence the high-quality polymer can be prepared economically advantageously.

According to the continuous solution polymerization process of a monomer comprising methyl methacrylate as a main component in methanol as a solvent regarding the present invention, a methacrylic polymer having an excellent quality can be prepared with a high productivity under stable operating conditions, and this has an industrially large meaning.

Next, the present invention will be described in more detail with reference to examples. In these examples, catalytic activity and the like depend upon a catalyst component and its manufacturing method. Incidentally, the scope of the present invention should not be limited to these examples.

EXAMPLE 1

FIG. 1 is a schematic flow sheet of an apparatus equipped with one stirring tank, and one embodiment of the present invention will be described in accordance with this flow sheet. A fresh material solution comprising methyl methacrylate, methyl acrylate, methanol, 1-dodecanethiol and di-tert-butyl peroxide (whose half-value period at 160° C. is about 12 minutes) is blended with a recycling material solution in a material blending tank 1. The composition of the resulting blend is constituted of 85% by weight of a monomer mixture comprising 96 parts by weight of methyl methacrylate and 4 parts by weight of methyl acrylate, 15% by weight of methanol, 0.25% by weight (10.8 mmol/l) of 1-dodecanethiol and 0.01% by weight (0.5 mmol/l) of di-tert-butyl peroxide. The blended material is deoxidized with a nitrogen gas blown for 30 minutes by a disc atomizer in the material blending tank, and the material is then continuously fed to a reactor 6 equipped with a jacket through a line 2, a constant delivery pump 3, a line 4 and a feed opening 5 at a predetermined flow rate so that a mean residence time may be 5 hours. The reactor 6 equipped with the jacket is provided with a stirring shaft 8 extending from a motor 7, a stirring blade 9 attached to the stirring shaft 8 and a line for reflux condensation. This line for reflux condensation disposed for reaction control comprises a vapor drawing line 10, a condenser 11 and a reflux line 12, and a refluxed liquid which is fed to the condenser 11 via the vapor drawing line 10 and then condensed therein is fed to the reactor 6 equipped with the jacket through the reflux line 12. The condenser 11 is provided with a pressure regulating valve, and the pressure in the reactor 6 equipped with the jacket is controlled by a suitable pressure controller to maintain a pressure of about 15 kg/cm². By controlling the jacket temperature of the reactor 6 equipped with the jacket, the temperature of the material solution to be fed to the reactor 6 equipped with the jacket, the amount of the reflux-condensed liquid and the pressure in the condenser 11, the temperature of the reactor 6 equipped with the jacket is regulated to 160° C. and a polymerization ratio is regulated to 70 mol %, with the result that the molecular weight and the molecular distribution of the polymer prepared in the reactor can also be regulated precisely. At this time, the composition of the polymerizate is constituted of 59.4% by weight of the polymer, 24.9% by weight of methyl methacrylate, 0.7% by weight of methyl acrylate and 15% by weight of methanol. A part of the polymer solution in the reactor 6 equipped with the jacket is continuously fed to a heater 15 through a line 14 by a constant delivery pump 13 at such a flow rate that a liquid surface level in the reactor 6 equipped with the jacket is constant, and then heated up to 200° C. For the purpose of avoiding the heat deterioration of the polymerizate, the solution is homogeneously heated up to 200° C. in the shortest possible time. In order that the heated polymerizate may rapidly be fed to the extruder, the heater 15 is arranged as close as possible to a feed opening 19 of the extruder.

The outlet of the heater 15 is connected via a line 16 and a control valve 17 to a feed opening 20 arranged on the slightly downstream side of a first vent 19 of a vent extruder 18. By virtue of the control valve 17, the pressure in the heater 15 and the line 16 and the flow rate at the feed opening 20 are controlled so as to be constant, and the heated polymerizate is injected into the vent extruder 18 having a barrel temperature of 230° C. The pressure in the first vent 19 is maintained at 840 mmHg.

The polymer composition fed into the vent extruder 18 is heated and molten while forwarded by a screw, and TINUVIN P [2-(5-methyl-2-hydroxyphenyl)benzotriazole made by Japanese Ciba-Geigy] is fed from an additive blending tank 21 to the vented extruder 18 through a line 22 and an additive feed opening 23. The molten and kneaded polymer is forwarded to a second vent 24 maintained at 200 mmHg and a volatile content is removed at this second vent 24, and the polymer is then continuously extruded through a die 25. Next, a strand 26 extruded through the die 25 is cooled in a water bath 27, and then molded into pellets 29 by a pelletizer 28. The volatile content evaporated at the time of the injection of the polymerizate into the extruder 18 is exhausted from the first vent 19 via a line 30, and the volatile content separated in the extruder 18 is exhausted from the second vent 24 via a line 25, and the respective volatile contents are fed to a distillation column 32. After a high-boiling substance has been removed through a valve 33 and a line 34, a vapor containing methanol and the unreacted monomer as main components is forwarded to a condenser 36 via a line 35, and it is condensed therein. The thus condensed liquid is forwarded to a receiver 38 via a line 37 and then recovered therein. The condensed liquid collected in the receiver 38 is recycled to the material step via a line 39, a constant delivery pump 40 and a line 43, and the remaining component is forwarded to a vacuum device 44 through a line 41 and a heat exchanger 42. In this way, the loop of the process is established.

The obtained polymer was colorless and transparent, and from the results of measurement by gas chromatography (GC), the remaining volatile content was constituted of 0.20% by weight of methyl methacrylate, 0.01% by weight of methyl acrylate and 50 ppm or less of methanol. For the obtained polymer, a melt flow rate (MFR) was measured at 230° C. under a load of 3.80 kg in accordance with ASTM D1238, and as a result, it was 1.7 g/10 minutes. The molecular weight distribution of the polymer was measured by GPC, and from the obtained results, the average-weight molecular weight of the polymer was 100,000. In addition, the polymer was subjected to thermogravimetric analysis under a nitrogen gas stream by the use of a thermogravimetric analysis device RTG 220 made by Seiko Instruments Inc., and as a result, the thermal decomposition ratio of the polymer was 0.7% by weight. By the use of an injection molding machine Arburg 75t, the obtained polymer was injection molded into discs having a diameter of 100 mm and a thickness of 3 mm. In this case, the injection molding was carried out as much as 100 shots, and at this time, molding defects such as silver streaks and foaming did not occur. For this molded disc, a total light transmittance was measured by a color-difference meter made by Nippon Denshoku Co., Ltd., and as a result, it was 93%, and according to a transmission method, the YI of the disc was 1.8.

EXAMPLE 2

Figure 2:
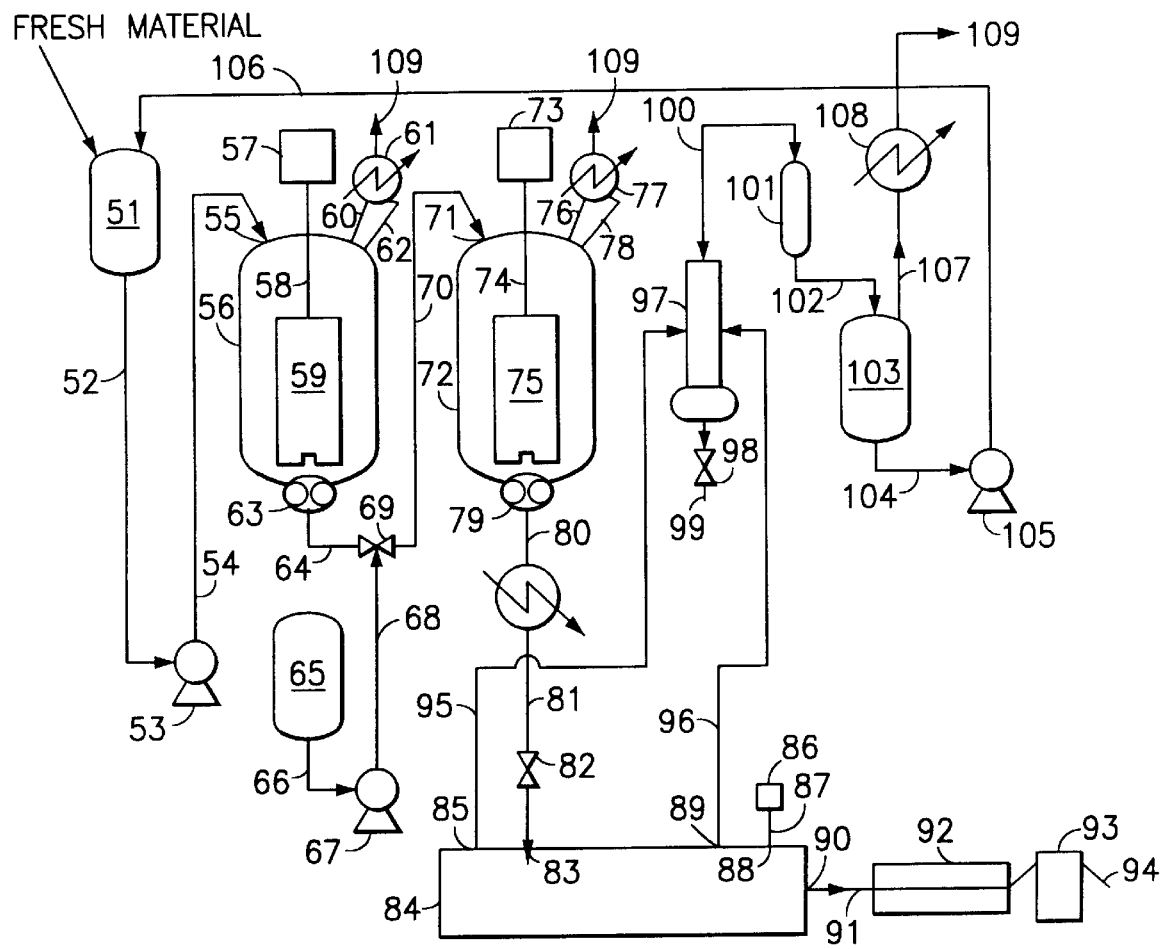
FIG. 2 is a schematic view of an apparatus used in Example 2, and in this drawing, reference numeral 51 is a material blending tank, numeral 52 is a line, 53 is a constant delivery pump, 54 is a line, 55 is a feed opening, 56 is a first reactor equipped with a jacket, 57 is a motor, 58 is a stirring shaft, 59 is a stirring blade, 60 is a vapor drawing line, 61 is a condenser, 62 is a reflux line, 63 is a constant delivery pump, 64 is a line, 65 is a side feed material blending tank, 66 is a line, 67 is a constant delivery pump, 68 is a line, 69 is a valve, 70 is a line, 71 is a feed opening, 72 is a second reactor equipped with a jacket, 73 is a motor, 74 is a stirring shaft, 75 is a stirring blade, 76 is a vapor drawing line, 77 is a condenser, 78 is a reflux line, 79 is a constant delivery pump, 80 is a line, 81 is a line, 82 is a control valve, 83 is a feed opening for a polymerizate, 84 is an extruder, 85 is a first vent, 86 is an additive blending tank, 87 is a line, 88 is a feed opening for additives, 89 is a second vent, 90 is a die of the extruder, 91 is a polymer strand, 92 is a water bath, 93 is a pelletizer, 94 is pellets, 95 and 96 are lines, 97 is a distillation column, 98 is a valve, 99 is a line, 100 is a line, 101 is a condenser, 102 is a line, 103 is a receiver, 104 is a line, 105 is a constant delivery pump, 106 is a line, 107 is a line, 108 is a heat exchanger, and 109 a line leading to is a vacuum device.

FIG. 2 shows a schematic flow sheet of an apparatus equipped with serially connected two stirring tanks, and another embodiment of the present invention will be described in accordance with this flow sheet. A fresh material solution comprising methyl methacrylate, ethyl acrylate, methanol, 1-octanethiol and di-tert-amyl peroxide (whose half-value period at 150° C. is about 16 minutes) is blended with a recycling material solution in a material blending tank 51. The composition of the resulting blend is constituted of 93% by weight of a monomer mixture comprising 90 parts by weight of methyl methacrylate and 10 parts by weight of ethyl acrylate, 7% by weight of methanol, 0.09% by weight (5.3 mmol/l) of 1-octanethiol and 0.03% by weight (1.0 mmol/l) of di-tert-amyl peroxide. The blended material is deoxidized by counter current replacement with nitrogen in a line 52, and the material is then continuously fed to a first reactor 56 equipped with a jacket through a line 52, a constant delivery pump 53, a line 54 and a feed opening 55 at a predetermined flow rate so that a mean residence time may be 3 hours. The first reactor 56 equipped with the jacket is provided with a stirring shaft 58 extending from a motor 57, a stirring blade 59 attached to the stirring shaft 58 and a line for reflux condensation.

This line for reflux condensation disposed for reaction control comprises a vapor drawing line 60, a condenser 61 and a reflux line 62, and a refluxed liquid which is fed to the condenser 61 via the vapor drawing line 60 and then condensed therein is fed to the first reactor 56 equipped with the jacket through the reflux line 62. The condenser 61 is provided with a pressure regulating valve, and the pressure in the first reactor 56 equipped with the jacket is controlled by a suitable pressure controller to maintain a pressure of about 9 kg/cm$^2$G. By controlling the jacket temperature of the first reactor 56 equipped with the jacket, the temperature of the material solution to be fed to the first reactor 56 equipped with the jacket, the amount of the reflux-condensed liquid and the pressure in the condenser 61, the temperature of the first reactor 56 equipped with the jacket is regulated to 150° C. and a polymerization ratio is regulated to 65 mol %, with the result that the polymerization ratio, the molecular weight and the molecular distribution of the polymer prepared in the first reactor can also be regulated precisely. An intermediate polymerization reaction solution, which has continuously been drawn from the first reactor 56 equipped with the jacket by the use of a constant delivery pump 63 at such a flow rate that a liquid surface level 56 in the first reactor 56 equipped with the jacket is constant, is mixed, in a valve 69, with a side feed material which has prepared in a side feed material blending tank 65, deoxidized, and then fed via a line 66. Next, the mixture is continuously fed at a constant flow rate to a second reactor 72 equipped with the jacket through a feed opening 71 and a line 70. The composition of the side feed material is constituted of 95% by weight of a monomer mixture comprising 80 parts by weight of methyl methacrylate and 20 parts by weight of ethyl acrylate, 5% by weight of methanol, 0.005% by weight (0.3 mmol/l) of 1-octanethiol and 0.05% by weight (2.0 mmol/t) of di-tert-amyl peroxide, and the weight ratio of the intermediate polymerization reaction solution drawn from the first reactor 56 equipped with the jacket to the side feed material is 10:1. The second reactor 72 equipped with the jacket is provided with a stirring shaft 74 extending from a motor 73, a stirring blade 75 attached to the stirring shaft 74 and a line for reflux condensation.

This line for reflux condensation disposed for reaction control comprises a vapor drawing line 76, a condenser 77 and a reflux line 78, and a refluxed liquid which is fed to the condenser 77 via the vapor drawing line 76 and then condensed therein is fed to the second reactor 72 equipped with the jacket through the reflux line 78. The condenser 77 is provided with a pressure regulating valve, and the pressure in the second reactor 72 equipped with the jacket is controlled by a suitable pressure controller to maintain a pressure of about 10 kg/cm$^2$G. By controlling the jacket temperature of the second reactor 72 equipped with the jacket, the temperature of the intermediate polymerization reaction solution to be fed to the second reactor 72 equipped with the jacket, the amount of the reflux-condensed liquid and the pressure in the condenser 77, the temperature of the second reactor 72 equipped with the jacket is regulated to 150° C. and a total polymerization ratio was regulated to 90 mol %, with the result that the polymerization ratio, the molecular weight and the molecular distribution of the polymer prepared in the second reactor can also be regulated precisely. At this time, the composition of the polymerizate is constituted of 83.9% by weight of the polymer, 8.7% by weight of methyl methacrylate, 0.6% by weight of methyl acrylate and 6.8% by weight of methanol.

A part of the polymerization reaction solution in the second reactor 72 equipped with the jacket is continuously drawn out via a line 80 to a line 81 by the use of a constant delivery pump 79 at such a flow rate that a mean residence time is 4 hours and a liquid surface level is maintained, and this solution is then kept at 150° C. The outlet of the second reactor 72 is directly connected via a line 81 and a control valve 82 to a feed opening 83 arranged on the slightly downstream side of a first vent 85 of an extruder 84. By virtue of the control valve 82, the pressure in the line 81 and the flow rate at the feed opening 83 are controlled so as to be constant, and the heated polymerizate is injected into the vent extruder 84 in which a barrel temperature is maintained at 240° C. The pressure in the first vent is maintained at 610 mmHg. The polymer composition injected into the extruder 84 is heated and molten while forwarded by a screw, and monoglyceride stearate is then fed from an additive blending tank 86 to the extruder 84 through a line 87 and an additive feed opening 88. The molten and kneaded polymer is forwarded to a second vent 89 and a volatile content is removed at this vent, and the polymer is then continuously extruded through a die 90. Next, a strand 91 extruded through the die 90 is cooled in a water bath 92, and then molded into pellets 94 by a pelletizer 93. The volatile content evaporated at the time of the injection of the polymerizate into the extruder 84 is exhausted from the first vent 85 via a line 95, and the volatile content separated in the extruder 84 is exhausted via a line 96 from the second vent 89 in which a pressure of 10 mmHg is kept, and the respective volatile contents are fed to a distillation column 97. After a high-boiling substance has been removed through a valve 98 and a line 99, a vapor containing the solvent and the unreacted monomer as main components is forwarded to a condenser 101 via a line 100, and it is then condensed therein. The thus condensed liquid is forwarded to a receiver 103 via a line 102 and then recovered therein. The condensed liquid recovered in the receiver 103 is recycled to the material step via a line 104, a constant delivery pump 105 and a line 106, and the remaining component is forwarded to a vacuum device 109 through a line 107 and a heat exchanger 108. In this way, the loop of the process is established.

The obtained polymer was colorless and transparent, and from the results of measurement by GC, the remaining volatile content was constituted of 0.14% by weight of methyl methacrylate, 0.11% by weight of ethyl acrylate and 50 ppm or less of methanol. For the obtained polymer, MFR was measured at 230° C. under a load of 3.80 kg in accordance with ASTM D1238, and as a result, it was 11.0 g/10 minutes. The molecular weight distribution of the polymer was measured by GPC, and from the obtained results, the average-weight molecular weight of the polymer was 110,000. In addition, the polymer was subjected to thermogravimetric analysis under a nitrogen gas stream by the use of a thermogravimetric analysis device RTG 220 made by Seiko Instruments Inc., and as a result, the thermal decomposition ratio of the polymer was 0.9% by weight. By the use of an injection molding machine Arburg 75t, the obtained polymer was injection molded into discs having a diameter of 100 mm and a thickness of 3 mm. In this case, the injection molding was carried out as much as 100 shots, and at this time, molding defects such as silver streaks and foaming did not occur. For this molded disc, a total light transmittance was measured by a color-difference meter made by Nippon Denshoku Co., Ltd., and as a result, it was 93%, and according to a transmission method, the YI of the disc was 1.2.

EXAMPLE 3

An apparatus shown in FIG. 1 was used, and 4.5 kg of a mixture comprising 60.0 parts by weight of polymethyl methacrylate, 25.6 parts by weight of methyl methacrylate, 1.1 parts by weight of methyl acrylate and 13.3 parts of methanol was placed in a reactor 6 equipped with a jacket, followed by heating it up to 150° C. in order to homogeneously dissolve the respective components. This mixture was continuously drawn out of the reactor at 1 kg/hr via a line 14 by means of a constant delivery pump 13, forwarded to a heater 15, and then fed to a vent extruder 18 having a barrel temperature of 220° C. through a line 16 and a control valve 17, while maintained at 150° C. By virtue of the control valve 17, the pressure in the inlet portion of the heater 15 was maintained at 25 kg/cm$^2$G, so that the pressure of the line 16 and the flow rat of the mixture at a feed opening 21 were constantly controlled, and the pressure in a first vent 19 was maintained at 840 mmHg.

The resulting polymer composition which had been poured into the vent extruder 18 was heated and molten while carried by a screw, whereby a volatile content was further removed from a second vent 24 maintained at 150 mmHg. Afterward, the composition was extruded through a die 25, and after cooling in a water bath 27, it was taken out therefrom in the form of pellets 29.

In the polymer sampled in the vicinity of the first vent, 3.82% of methyl methacrylate and 0.13% of methyl acrylate were contained as the remaining volatile content. Furthermore, as the remaining volatile content in the pellets, 0.21% of methyl methacrylate and 0.01% of methyl acrylate were present, and the polymer had a total light transmission of 93% and a good appearance which was colorless and transparent.

Examples 4 to 22, Comparative Examples 1 and 2

A polymer solution mixture was first prepared in which a copolymer obtained from a material containing methyl acrylate, ethyl acrylate or n-butyl acrylate as a comonomer was contained, and devolatilization was then carried out in the same manner as in Example 3 to obtain a polymer in the form of pellets. Tables 1 to 4 each shows a material composition, a heating temperature, a feed rate, devolatilization and extrusion conditions, and the remaining volatile content and the total light transmittance of the obtained polymer pellets. In "Manner of Feed to Vent Extruder" of Tables 1 to 4, (A) means injecting the polymerizate directly to the feed opening of the extruder and (B) means flushing the polymerizate through a nozzle arranged at the feed opening of the extruder.

TABLE 1

|  | Example | | | | | |
| --- | --- | --- | --- | --- | --- | --- |
|  | 4 | 5 | 6 | 7 | 8 | 9 |
| Comonomer | MA | MA | MA | MA | MA | MA |
| Amount in Polymer (%) | 4 | 4 | 4 | 4 | 4 | 4 |
| Solvent | Me | Me | Me | Me | Me | Me |
| Composition of Polymerizate (%) | | | | | | |
| Polymer | 60.0 | 60.0 | 60.0 | 60.0 | 60.0 | 60.0 |
| MMA | 25.6 | 25.6 | 25.6 | 25.6 | 25.6 | 25.6 |
| Comonomer | 1.1 | 1.1 | 1.1 | 1.1 | 1.1 | 1.1 |

TABLE 1-continued

|  | Example |  |  |  |  |  |
|---|---|---|---|---|---|---|
|  | 4 | 5 | 6 | 7 | 8 | 9 |
| Solvent | 13.3 | 13.3 | 13.3 | 13.3 | 13.3 | 13.3 |
| Feed Temp. of Polymerizate (°C.) | 150 | 150 | 150 | 150 | 150 | 150 |
| Feed Rate (kg/hr) | 1.0 | 1.0 | 1.0 | 1.0 | 1.0 | 1.0 |
| Heater Outlet Temp. (°C.) | 190 | 190 | 190 | 190 | 190 | 190 |
| Pressure in Heater Inlet (kg/cm$^2$) | 25 | 35 | 25 | 20 | 15 | 30 |
| Manner of Feed to Vent Extruder | (A) | (A) | (A) | (A) | (A) | (A) |
| Pressure in First Vent (mmHg) | 760 | 760 | 1060 | 460 | 760 | 760 |
| Remaining Volatile Content at Feed Opening of Extruder (%) |  |  |  |  |  |  |
| MMA | 4.20 | 4.70 | 4.90 | 2.40 | 5.60 | 3.00 |
| Comonomer | 0.12 | 0.14 | 0.14 | 0.07 | 0.16 | 0.09 |
| Solvent | 0.05 | 0.04 | 0.05 | 0.04 | 0.05 | 0.04 |
| Extruder Barrel Temp. (°C.) | 230 | 230 | 230 | 230 | 230 | 230 |
| Vacuum Degree in Second Vent (mmHg) | 150 | 150 | 150 | 150 | 150 | 150 |
| Extruded Pellets Remaining Volatile Content (%) |  |  |  |  |  |  |
| MMA | 0.33 | 0.36 | 0.37 | 0.23 | 0.41 | 0.27 |
| Comonomer | 0.01 | 0.01 | 0.01 | 0.01 | 0.01 | 0.01 |
| Solvent | ND | ND | ND | ND | ND | ND |
| Total Light transmittance (%) | 93 | 93 | 93 | 93 | 93 | 93 |

MA: Methyl acrylate
MMA: Methyl methacrylate
Me: Methanol
ND: Not detected by GC (0.01% or less)

TABLE 2

|  | Example |  |  |  |  |  |
|---|---|---|---|---|---|---|
|  | 10 | 11 | 12 | 13 | 14 | 15 |
| Comonomer | MA | MA | MA | MA | MA | MA |
| Amount in Polymer (%) | 4 | 4 | 4 | 4 | 4 | 4 |
| Solvent | Me | Me | Me | Me | Me | Me |
| Composition of Polymerizate (%) |  |  |  |  |  |  |
| Polymer | 60.0 | 60.0 | 60.0 | 60.0 | 50.0 | 70.0 |
| MMA | 25.6 | 25.6 | 25.6 | 25.6 | 35.2 | 20.5 |
| Comonomer | 1.1 | 1.1 | 1.1 | 1.1 | 1.5 | 0.9 |
| Solvent | 13.3 | 13.3 | 13.3 | 13.3 | 13.3 | 8.6 |
| Feed Temp. of Polymerizate (°C.) | 150 | 150 | 150 | 150 | 150 | 150 |
| Feed Rate (kg/hr) | 1.0 | 1.0 | 1.0 | 1.0 | 1.0 | 1.0 |
| Heater Outlet Temp. (°C.) | 190 | 190 | 190 | 190 | 190 | 190 |
| Pressure in Heater Inlet (kg/cm$^2$) | 25 | 35 | 20 | 25 | 27 | 15 |
| Manner of Feed to Vent Extruder | (B) | (B) | (B) | (B) | (A) | (A) |
| Pressure in First Vent (mmHg) | 760 | 760 | 460 | 760 | 760 | 760 |
| Remaining Volatile Content at Feed Opening of Extruder (%) |  |  |  |  |  |  |
| MMA | 4.10 | 4.60 | 2.30 | 3.60 | 5.20 | 2.10 |
| Comonomer | 0.12 | 0.13 | 0.07 | 0.11 | 0.15 | 0.06 |
| Solvent | 0.04 | 0.05 | 0.04 | 0.05 | 0.04 | 0.05 |
| Extruder Barrel Temp. (°C.) | 230 | 230 | 230 | 230 | 230 | 230 |
| Vacuum Degree in Second Vent (mmHg) | 150 | 150 | 150 | 150 | 150 | 150 |
| Extruded Pellets Remaining Volatile Content (%) |  |  |  |  |  |  |
| MMA | 0.33 | 0.36 | 0.23 | 0.30 | 0.39 | 0.22 |
| Comonomer | 0.01 | 0.01 | 0.01 | 0.01 | 0.01 | 0.01 |
| Solvent | ND | ND | ND | ND | ND | ND |
| Total Light Transmittance (%) | 93 | 93 | 93 | 93 | 93 | 93 |

MA: Methyl acrylate
Me: Methanol
ND: Not detected by GC (0.01% or less)

TABLE 3

|  | Example | | | | | |
|---|---|---|---|---|---|---|
|  | 16 | 17 | 18 | 19 | 20 | 21 |
| Comonomer | MA | MA | MA | EA | BA | MA |
| Amount in Polymer (%) | 4 | 9 | 4 | 4 | 4 | 4 |
| Solvent | Me | Me | Me | Me | Me | Me |
| Composition of Polymerizate (%) | | | | | | |
| Polymer | 40.6 | 60.0 | 60.0 | 60.0 | 60.0 | 60.0 |
| MMA | 28.2 | 24.3 | 25.6 | 25.6 | 25.6 | 25.6 |
| Comonomer | 1.2 | 2.4 | 1.1 | 1.1 | 1.1 | 1.1 |
| Solvent | 28.0 | 13.3 | 13.3 | 13.3 | 13.3 | 13.3 |
| Feed Temp. of Polymerizate (°C.) | 150 | 150 | 150 | 150 | 150 | 150 |
| Feed Rate (kg/hr) | 1.0 | 1.0 | 1.0 | 1.0 | 1.0 | 1.0 |
| Heater Outlet Temp. (°C.) | 190 | 190 | 150 | 190 | 190 | 190 |
| Pressure in Heater Inlet (kg/cm$^2$) | 30 | 25 | 20 | 25 | 25 | 25 |
| Manner of Feed to Vent Extruder | (A) | (A) | (A) | (A) | (A) | (A) |
| Pressure in First Vent (mmHg) | 680 | 760 | 460 | 760 | 760 | 760 |
| Remaining Volatile Content at Feed Opening of Extruder (%) | | | | | | |
| MMA | 2.50 | 3.40 | 3.60 | 4.10 | 4.20 | 4.10 |
| Comonomer | 0.04 | 0.24 | 0.11 | 0.14 | 0.18 | 0.12 |
| Solvent | 0.04 | 0.05 | 0.04 | 0.04 | 0.05 | 0.04 |
| Extruder Barrel Temp. (°C.) | 230 | 230 | 230 | 230 | 230 | 230 |
| Vacuum Degree in Second Vent (mmHg) | 100 | 150 | 150 | 150 | 150 | 150 |
| Extruded Pellets Remaining Volatile Content (%) | | | | | | |
| MMA | 0.18 | 0.29 | 0.40 | 0.33 | 0.33 | 0.33 |
| Comonomer | 0.01 | 0.02 | 0.01 | 0.01 | 0.01 | 0.01 |
| Solvent | ND | ND | ND | ND | ND | ND |
| Total Light Transmittance (%) | 93 | 93 | 93 | 93 | 93 | 93 |

MA: Methyl acrylate
EA: Ethyl acrylate
BA: n-butyl acrylate
Me: Methanol
ND: Not detected by GC (0.01% or less)

|  | Ex. 22 | Comp. Ex. 1 | Comp. Ex. 2 |
|---|---|---|---|
| Comonomer | MA | MA | MA |
| Amount in Polymer (%) | 4 | 4 | 4 |
| Solvent | Me | TOL | None |
| Composition of Polymerizate (%) | | | |
| Polymer | 60.0 | 60.0 | 71.0 |
| MMA | 25.6 | 25.6 | 27.8 |
| Comonomer | 1.1 | 1.1 | 1.2 |
| Solvent | 13.3 | 13.3 | 0.0 |
| Feed Temp. of Polymerizate (°C.) | 150 | 150 | 150 |
| Feed Rate (kg/hr) | 1.0 | 1.0 | 1.0 |
| Heater Outlet Temp. (°C.) | 190 | 190 | 190 |
| Pressure in Heater Inlet (kg/cm$^2$) | 24 | 8 | 7 |
| Manner of Feed to Vent Extruder | (A) | (A) | (A) |
| Pressure in First Vent (mmHg) | 760 | 760 | 760 |
| Remaining Volatile Content at Feed Opening of Extruder (%) | | | |
| MMA | 4.20 | 9.50 | 9.70 |
| Comonomer | 0.12 | 0.28 | 0.28 |
| Solvent | 0.05 | 4.93 | ND |
| Extruder Barrel Temp. (°C.) | 230 | 230 | 230 |
| Vacuum Degree in Second Vent (mmHg) | 150 | 150 | 150 |
| Extruded Pellets Remaining Volatile Content (%) | | | |
| MMA | 0.33 | 1.16 | 1.18 |
| Comonomer | 0.01 | 0.03 | 0.03 |
| Solvent | ND | 0.60 | ND |
| Total Light Transmittance (%) | 93 | 93 | 93 |

MA: Methyl acrylate
Me: Methanol
TOL: Toluene
ND: Not detected by GC (0.01% or less)

What is claimed is:

1. A process for preparing a polymer which comprises the steps of:

(a) carrying out a continuous polymerization reaction of a monomer which comprises methyl methacrylate alone or a monomer mixture thereof, the monomer mixture comprising 75% by weight or more of methyl methacrylate and 25% by weight or less of an alkyl acrylate, in a homogeneous solution state in the presence of 0.1 to 160 mmol/l of a radical polymerization initiator having a half-value period of 0.6 to 60 minutes at a polymerization temperature and 0.1 to 370 mmol/l of a chain transfer agent based on a mixture of 71 to 95 parts by weight of the methyl methacrylate alone or the monomer mixture thereof and 29 to 5 parts by weight of methanol as a solvent, in a polymerization reactor comprising one or two serially connected polymerization tanks so that the monomer has a conversion of 55 to 93 mol % at the polymerization temperature of 100° to 180° C., (b) directly feeding, at a temperature of 130° to 270° C., a polymerizate containing volatiles drawn from the polymerization reactor, to a feed opening in an extruder having a barrel, a screw and a plurality of vents, the barrel being at a temperature of 170° to 270° C., and (c) extruding the polymerizate through the extruder, while substantially all of the volatiles are separated and recovered through a first vent of the extruder and remaining volatiles being removed through at least one other vent disposed downstream from the first vent, the at least one other vent being set to a vent pressure of 1 to 400 mmHg, thereby preparing the polymer in which the remaining volatiles have a content of 1% by weight or less, a weight-average molecular weight measured by gel permeation chromatography is 80,000 to 200,000, and a thermal decomposition ratio is 3.0% by weight or less.

2. The process for preparing a polymer according to claim 1 wherein the polymerization temperature in the polymerization tank is 130° to 170° C.

3. The process for preparing a polymer according to claim 1 wherein a mean residence time in the polymerization tank is 2 to 7 hours.

4. The process for preparing a polymer according to claim 1 wherein step (a) is carried out with one polymerization tank.

5. The process for preparing a polymer according to claim 1 wherein the polymerizate is fed onto the screw of the extruder through a feed opening of the extruder at a temperature of 135° to 250° C.

6. The process for preparing a polymer according to claim 1 wherein step (a) is carried out with the monomer mixture comprising methyl methacrylate and at least one alkyl acrylate selected from the group consisting of methyl acrylate, ethyl acrylate and n-butyl acrylate.

7. The process for preparing a polymer according to claim 1 wherein the half-value period of the radical polymerization initiator at the polymerization temperature is 1 to 30 minutes, and the radical polymerization initiator has a concentration of 0.1 to 100 mmol/l.

8. The process for preparing a polymer according to claim 1 wherein the polymer obtained from the process has a thermal decomposition ratio of 1.0% by weight or less.

9. The process for preparing a polymer according to claim 5 wherein the polymerizate is fed to the extruder via a control valve.

10. The process for preparing a polymer according to claim 1 wherein the devolatilization is accomplished by:

(a) heating the polymerizate up to 120° to 270° C. with a heater, and (b) feeding the resultant heated polymerizate into the first vent of the extruder wherein the pressure in the first vent is maintained at 230 to 2280 mmHg, or feeding the polymerizate onto the screw of the extruder through a feed opening formed through the barrel of the extruder in the vicinity of the first vent.

11. The process for preparing a polymer according to claim 1 wherein the polymerizate contains 5 to 55% by weight of the monomer and 5 to 65% by weight of the solvent.

12. The process for preparing a polymer according to claim 1 wherein the polymerizate is fed into the first vent of the extruder wherein the pressure is maintained at 380 to 1140 mmHg or the polymerizate is fed onto the screw of the extruder through a feed opening formed through the barrel of the extruder in the vicinity of the first vent.

13. The process for preparing a polymer according to claim 1 wherein the polymerizate is fed onto the screw of the extruder via a nozzle selected from the group consisting of a needle valve, a bent plug and a strand die.

14. The process for preparing a polymer according to claim 1 wherein the polymerizate is fed into the extruder through a feed opening formed through the barrel of the extruder in the vicinity of the first vent of the extruder.

15. The process for preparing a polymer according to claim 1 wherein the polymerizate is blown against the screw of the extruder through a nozzle disposed at the feed opening of the extruder.

16. The process for preparing a polymer according to claim 1 wherein the methanol is in an amount of 25 to 7 parts by weight based on 25 to 93 parts by weight of the monomer.

17. The process for preparing a polymer according to claim 16 wherein the polymerization initiator is selected from the group consisting of di-tert-butyl peroxide, di-tert-amyl peroxide, α,α'-azobisisobutylonitrile, benzoyl peroxide, tertbutyl-peroxyisopropyl carbonate, tert-butyl peroxybenzoate, dicumyl peroxide, tert-amylcumyl peroxide, tert-butylperoxy (2-ethyl hexanoate), tert-amylperoxy isononanoate and terthexylperoxyisopropyl carbonate; the polymerization initiator has a concentration of 0.1 to 100 mmol/l; and the chain transfer agent is selected from the group consisting of 1-butanethiol, 2-butane-thiol, 1 octanethiol, 1-dodecanethiol, 2-methyl-2-heptanethiol, 2-methyl-2-undecanethiol, 2-methyl-2-propanethiol, mercaptoacetic acid, 3-mercaptopropionic acid and 2-mercaptoethanol.

18. The process for preparing a polymer according to claim 17 wherein the polymerization temperature is 130° to 170° C.; and the monomer conversion is 60 to 90 mol %.

19. The process for preparing a polymer according to claim 18 wherein step (a) is carried out with a polymerization reaction mixture consisting essentially of the methacrylate or the mixture thereof with the alkyl acrylate, the radical polymerization initiator, the chain transfer agent and with methanol as the solvent; a mean residence time in the polymerization tank is 2.5 to 6 hours; the devolatilization temperature is 135° to 250° C.; the barrel temperature is 180° to 260° C.; and the remaining volatile content is 0.50% by weight or less.

20. The process for preparing a polymer according to claim 10 wherein the heater is a heat exchanger.

* * * * *